US009930630B2

(12) United States Patent
Liu et al.

(10) Patent No.: US 9,930,630 B2
(45) Date of Patent: Mar. 27, 2018

(54) POSITION DETERMINATION METHOD AND DEVICE, AND COMPUTER STORAGE MEDIUM

(71) Applicant: Sanechips Technology Co., Ltd., Shenzhen (CN)

(72) Inventors: Zhongwei Liu, Shenzhen (CN); Qinxin Li, Shenzhen (CN); Ning Qiu, Shenzhen (CN); Yannan Xing, Shenzhen (CN); Qianchao Gan, Shenzhen (CN)

(73) Assignee: Sanechips Technology Co., Ltd., Shenzhen (CN)

( * ) Notice: Subject to any disclaimer, the term of this patent is extended or adjusted under 35 U.S.C. 154(b) by 88 days.

(21) Appl. No.: 14/916,728

(22) PCT Filed: May 22, 2014

(86) PCT No.: PCT/CN2014/078145
§ 371 (c)(1),
(2) Date: Mar. 25, 2016

(87) PCT Pub. No.: WO2014/173352
PCT Pub. Date: Oct. 30, 2014

(65) Prior Publication Data
US 2016/0198423 A1 Jul. 7, 2016

(30) Foreign Application Priority Data

Sep. 4, 2013 (CN) .......................... 2013 1 0398724

(51) Int. Cl.
*H04W 56/00* (2009.01)
*G01S 5/02* (2010.01)
(Continued)

(52) U.S. Cl.
CPC ............. *H04W 56/001* (2013.01); *G01S 5/02* (2013.01); *G01S 5/0205* (2013.01);
(Continued)

(58) Field of Classification Search
CPC ... H04W 56/001; H04W 64/00; H04W 52/04; H04W 72/0446; H04L 5/0048; G01S 5/02; G01S 5/0205
See application file for complete search history.

(56) References Cited

U.S. PATENT DOCUMENTS

2014/0119211 A1* 5/2014 Zhang ............... H04W 36/0088
370/252

FOREIGN PATENT DOCUMENTS

CN 1512794 A 7/2004
CN 101106394 A 1/2008
(Continued)

OTHER PUBLICATIONS

English translation of CN102457325A, May 16, 2012 [retrieved on Jul. 21, 2017]. Retrieved from the Internet: <URL: https://encrypted.google.com/patents/CN102457325A?cl=en>. pp. 1-7.*
(Continued)

*Primary Examiner* — Omar Ghowrwal
(74) *Attorney, Agent, or Firm* — Oppedahl Patent Law Firm LLC

(57) ABSTRACT

The present disclosure discloses a method and device for determining a position, and a computer storage medium. The method includes that a first power value for a SYNC-NL segment within a DwPTS, a second power value for a first GP segment which precedes the SYNC-NL segment, a third power value for a second GP segment which follows the SYNC-NL segment, and a fourth power value for a time slot 0 are acquired; an eigenvalue of the DwPTS is calculated according to the first power value, the second power value,
(Continued)

the third power value and the fourth power value; and the position of the DwPTS is determined according to the eigenvalue.

12 Claims, 3 Drawing Sheets

(51) Int. Cl.
*H04L 5/00* (2006.01)
*H04W 72/04* (2009.01)
*H04W 52/04* (2009.01)
*H04W 64/00* (2009.01)

(52) U.S. Cl.
CPC ........... *H04L 5/0048* (2013.01); *H04W 52/04* (2013.01); *H04W 64/00* (2013.01); *H04W 72/0446* (2013.01)

(56) References Cited

FOREIGN PATENT DOCUMENTS

| CN | 101242221 A | 8/2008 |
| CN | 102457325 A | 5/2012 |
| WO | 2005015920 A1 | 2/2005 |
| WO | 2012051855 A1 | 4/2012 |

OTHER PUBLICATIONS

International Search Report in international application No. PCT/CN2014/078145, dated Aug. 26, 2014.
English Translation of the Written Opinion of the International Search Authority in international application No. PCT/CN2014/078145, dated Aug. 26, 2014.

* cited by examiner

POSITION DETERMINATION METHOD AND DEVICE, AND COMPUTER STORAGE MEDIUM

TECHNICAL FIELD

The present disclosure relates to communications and in particular to a method and a device for determining a position, and a computer storage medium.

BACKGROUND

A physical channel of a Time Division-Synchronous Code Division Multiple Access (TD-SCDMA) system adopts a four-layer structure including a super-frame, a radio frame, a sub-frame and a time slot/code. The length of a super-frame is 720 ms and is composed of 72 radio frames, and the length of each radio frame is 10 ms. In the TD-SCDMA system, each radio frame is divided into two sub-frames with the length of 5 ms. FIG. 1 is a structural diagram illustrating a time slot in a TD-SCDMA system according to the related art. As shown in FIG. 1, the time slot of each sub-frame is composed of seven main time slots with each length of 675 us and three special time slots. The three special time slots include a Downlink Pilot Time Slot (DwPTS, 75 us), an Uplink Pilot Time Slot (UpPTS, 125 us) and a Guard Period (GP, 75 us).

In the seven main time slots, a Ts0 is always allocated for a Downlink (DL), a Ts1 is always allocated for an Uplink (UL), and other time slots can serve as time slots for the uplink and can also serve as time slots for the downlink. The time slots of the uplink and the time slots of the downlink are separated by a transformation point. There are two transformation points (from the UL to the DL and from the DL to the UL) in each sub-frame with 5 ms in the TD-SCDMA system, and the positions of the transformation points depend on the configurations for UL and DL time slots of the cell.

A Cell Search (CSR) algorithm of the TD-SCDMA system is introduced below. FIG. 2 is a diagram illustrating functional modules in an initial CSR process in a TD-SCDMA system according to the related art. As shown in FIG. 2, the initial CSR process mainly includes four steps. At Step 1, a Synchronous Downlink (Sync-DL) code used by a current cell is searched out to complete DwPTS synchronization. At Step 2, a basic Midamble code and a scrambling code of the current cell are determined. At Step 3, multi-frame synchronization is achieved according to a phase modulation sequence of the DwPTS. At Step 4, information of a Broadcast Channel (BCH) is read.

Step 1 can include two sub-steps. At Sub-step 1, an approximate position of the DwPTS is found by using a correlation method or an energy window method. At Sub-step 2, the Sync-DL code is determined by using the correlation method. Sub-step 1 is used to accurately search for an initial position of the DwPTS, and thus, as a key step in the CSR, directly affects the subsequent CSR step.

A DwPTS position searching module is intended to find an approximate position of the Sync-DL code by using two methods. One is the energy window method for searching out according to the power distribution characteristics of the TD-SCDMA sub-frames, and the other is the correlation method for being correlated to 32 Sync-DL codes within the whole sub-frame range. Due to great computational work caused by the total correlation method, the energy window method is always adopted in an actual CSR process of the TD-SCDMA system.

The determination of the position of the DwPTS via the energy window method is introduced below. FIG. 3 is a diagram illustrating determination of a DwPTS position via an energy window method according to the related art. As shown in FIG. 3, in view of a structure of the TD-SCDMA frame, there is a GP of 32 chips on the left of the Sync-DL code, there is a GP of 96 chips on the right of the Sync-DL code, and the Sync-DL code itself has 64 chips. Due to low power of the GP, in terms of the time distribution for receiving power, compared with the GP, Sync-DL segment has relatively high power. A greater value is obtained by dividing the power sum of the Sync-DL segment by the power sum of 64 chips (32 chips at each side). The approximate position for the DwPTS can be determined by using the method. Thus, the approximate position for the DwPTS can be found by using a method for establishing a power feature window via a power shape of a receiving signal, wherein a calculation formula of an eigenvalue R is expressed as follows.

$$R = \frac{P1}{P2 + P3}.$$

However, input data of actual Radio Frequency (RF) have multiple interference factors such as RF bottom noise and external electromagnet interference. The time selective fading of the channel, the offset of the sampling point or the like determines that the accumulated power for the DwPTS may greatly fluctuate in 64 chips. FIG. 4 is a diagram illustrating interference in the CSR according to the related art.

In view of the comprehensive influence from various intrinsic and extrinsic factors, an ideal eigenvalue calculation formula is only applicable to an ideal laboratory environment with relatively high Signal to Noise Ratio (SNR). Once the eigenvalue calculation formula is applied to a complicated field environment, the success rate for searching out the eigenvalue in the CSR will significantly decrease.

An effective solution is not proposed currently for solving the problem of relatively low success rate in a solution for determining a DwPTS position according to the related art.

SUMMARY

The embodiments of the present disclosure provide a method and a device for determining a position, which are intended to solve the currently-existing technical problems.

According to an aspect of the present disclosure, an embodiment of the present disclosure provides a method for determining a position, which includes that: a first power value for a SYNC-DL segment within a DwPTS, a second power value for a first GP segment which precedes the SYNC-DL segment, a third power value for a second GP segment which follows the SYNC-DL segment, and a fourth power value for a time slot 0 are acquired; an eigenvalue of the DwPTS is calculated according to the first power value, the second power value, the third power value and the fourth power value; and the position of the DwPTS is determined according to the eigenvalue.

The calculation of the eigenvalue of the DwPTS according to the first power value, the second power value, the third power value and the fourth power value may be implemented by means of the following formula:

$$\text{eigenvalue} = \frac{(\text{first power value} + \text{fourth power value})/2}{\text{second power value} + \text{third power value}}.$$

The step that the first power value for the SYNC-DL segment is acquired may include that: spikes and glitches within the DwPTS are eliminated; and the first power value for the SYNC-DL segment within the DwPTS from which the spikes and the glitches are eliminated is acquired.

The step that the first power value for the SYNC-DL segment within the DwPTS from which the spikes and the glitches are eliminated is acquired may include that: a designated number of power points are set in the SYNC-DL segment, and each of the power points is calculated to obtain a designated number of power values; and the designated number of power values are sorted by size, and a mid-sized power value is multiplied by the designated number to obtain the first power value.

The calculation of the eigenvalue of the DwPTS according to the first power value, the second power value, the third power value and the fourth power value may be implemented by means of the following formula:

$$\text{eigenvalue} = \frac{\min(\text{first power value, fourth power value}) + \text{set constant}}{\max(\text{second power value, third power value}) \times 2 + \text{set constant}}.$$

The step that the fourth power value for the time slot 0 is acquired may include that: the fourth power value for a basic code part of the time slot 0 is acquired.

The method may further include that: a gap slot is set between the SYNC-DL segment and the first GP segment.

According to another aspect of the present disclosure, an embodiment of the present disclosure also provides a device for determining a position, which includes: a power value acquisition module configured to acquire a first power value for a SYNC-DL segment within a DwPTS, a second power value for a first GP segment which precedes the SYNC-DL segment, a third power value for a second GP segment which follows the SYNC-DL segment, and a fourth power value for a time slot 0; an eigenvalue calculation module configured to calculate an eigenvalue of the DwPTS according to the first power value, the second power value, the third power value and the fourth power value; and a position determination module configured to determine the position of the DwPTS according to the eigenvalue.

The eigenvalue calculation module may implement the calculation operation of the eigenvalue by means of the following formula:

$$\text{eigenvalue} = \frac{(\text{first power value} + \text{fourth power value})/2}{\text{second power value} + \text{third power value}}.$$

The power value acquisition module may include a glitch elimination unit configured to eliminate spikes and glitches within the DwPTS; and a first power value acquisition unit configured to acquire the first power value for the SYNC-DL segment within the DwPTS from which the spikes and the glitches are eliminated.

The first power value acquisition unit may include a power point calculation sub-unit configured to set a designated number of power points in the SYNC-DL segment, and calculate each of the power points to obtain a designated number of power values; and a first power value determination sub-unit configured to sort the designated number of power values by size, and multiply a mid-sized power value by the designated number to obtain the first power value.

The eigenvalue calculation module may implement the calculation operation of the eigenvalue by means of the following formula:

$$\text{eigenvalue} = \frac{\min(\text{first power value, fourth power value}) + \text{set constant}}{\max(\text{second power value, third power value}) \times 2 + \text{set constant}}.$$

The power value acquisition module may include a fourth power value acquisition unit configured to acquire the fourth power value for a basic code part of the time slot 0.

According to the embodiments of the present disclosure, the eigenvalue of the DwPTS is calculated according to the four power values including the first power value for the SYNC-DL segment within the DwPTS, the second power value for the first GP segment which precedes the SYNC-DL segment, the third power value for the second GP segment which follows the SYNC-DL segment, and the fourth power value for the time slot 0; and then the position of the DwPTS is determined according to the eigenvalue. The problem of relatively low success rate in the DwPTS position determination solution in the related art is solved. In the embodiments of the present disclosure, by means of the improvement for the DwPTS eigenvalue calculation formula, a new DwPTS eigenvalue calculation formula has a great resistance capability to various interference signals and timing offsets, and the success rate for the CSR in the TD-SCDMA system is significantly improved.

The above description is only the summary of the technical solutions of the present disclosure. In order to more clearly understand the technical means of the present disclosure, the solution can be implemented in accordance with the contents of the description. In addition, in order to better understand the above-mentioned contents of the present disclosure as well as other purposes, features and advantages, the detailed description of the present disclosure is specifically given below.

BRIEF DESCRIPTION OF THE DRAWINGS

In the drawings which may not be drawn proportionally, similar reference signs are used to describe similar parts in different views. The similar reference signs having different letter suffixes show different examples of the similar parts. In the drawings, each embodiment discussed in the present disclosure is substantially shown by means of an example instead of a limitation.

DETAILED DESCRIPTION

The present disclosure provides a method and device for determining a position, which are intended to solve the problem of relatively low success rate of the DwPTS position determination solution in the conventional art. The present disclosure is further described in detail below with reference to the drawings and the embodiments. It should be understood that the embodiments described herein are only intended to explain the present disclosure, rather than to limit the present disclosure.

Figure 1:
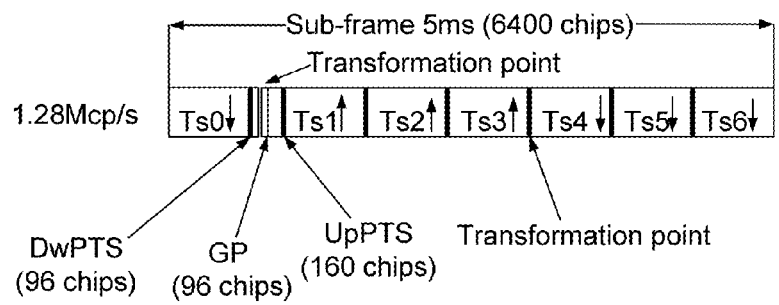
FIG. 1 is a structural diagram illustrating a time slot of a TD-SCDMA according to the related art.
Figure 2:
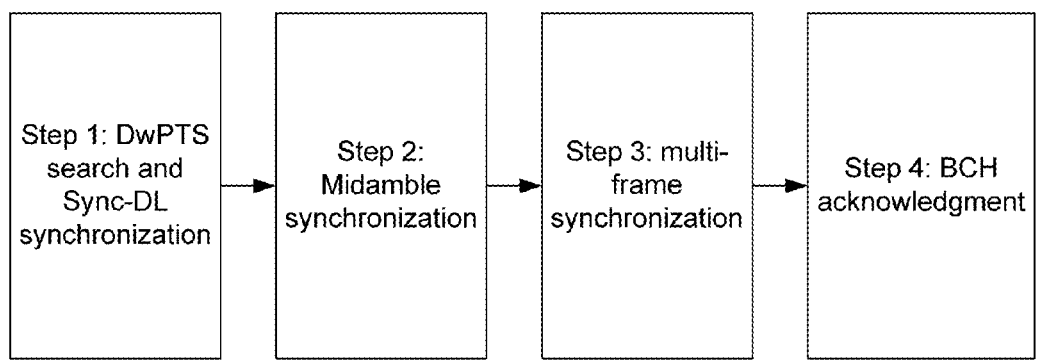
FIG. 2 is a diagram illustrating functional modules in an initial CSR process of a TD-SCDMA system according to the related art.
Figure 3:
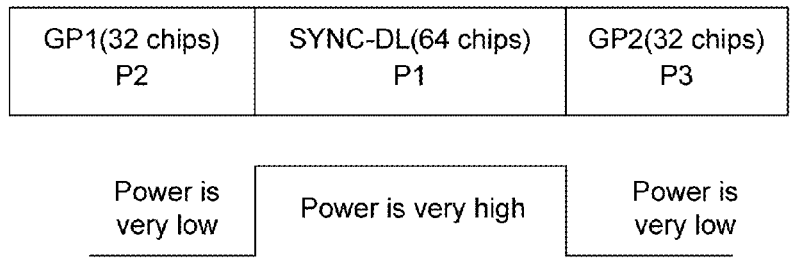
FIG. 3 is a diagram illustrating determination of a DwPTS position via an energy window method according to the related art.
Figure 4:
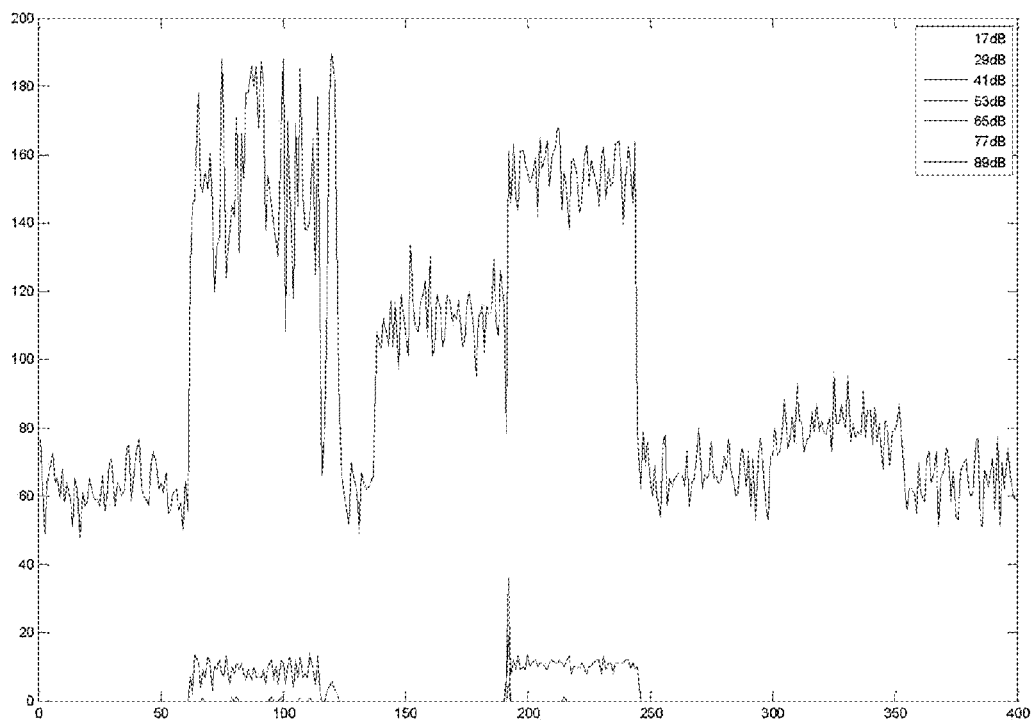
FIG. 4 is a diagram illustrating interference in the CSR according to the related art.
Figure 5:
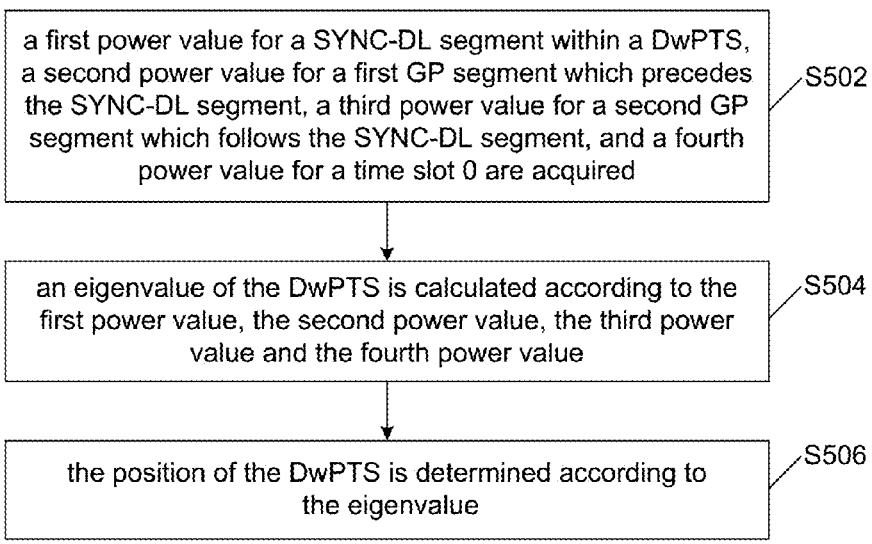
FIG. 5 is a flowchart showing a method for determining a position according to an embodiment of the present disclosure.

An embodiment provides a method for determining a position. FIG. 5 is a flowchart showing a method for determining a position according to an embodiment of the present disclosure. As shown in FIG. 5, the method includes the steps as follows.

At Step S502, a first power value for a SYNC-DL segment within a DwPTS, a second power value for a first GP segment which precedes the SYNC-DL segment, a third power value for a second GP segment which follows the SYNC-DL segment, and a fourth power value for a time slot 0 are acquired.

At Step S504, an eigenvalue of the DwPTS is calculated according to the first power value, the second power value, the third power value and the fourth power value.

At Step S506, the position of the DwPTS is determined according to the eigenvalue.

By means of the above method, the eigenvalue is calculated according to the four power values including the first power value for the SYNC-DL segment within the DwPTS, the second power value for the first GP segment which precedes the SYNC-DL segment, the third power value for the second GP segment which follows the SYNC-DL segment, and the fourth power value for the time slot 0, and then the position of the DwPTS is determined according to the eigenvalue. The problem of relatively low success rate of the DwPTS position determination solution in the related art is solved. In the embodiments of the present disclosure, by means of the improvement for the calculation formula for the eigenvalue of the DwPTS, a new calculation formula for the eigenvalue of the DwPTS has a great resistance capability to various interference signals and timing offsets, and the success rate for the CSR of the TD-SCDMA system is significantly improved.

Under an actual field situation, there are various glitch signals, which are easily mistaken for the DwPTS. The shapes of the glitch signals differ in thousands of ways, and the glitch signals are difficult to be completely filtered by means of the shapes. In view of a determined position relationship between the DwPTS and the Ts0, namely a difference of 64 chips between the end of a data2 signal of the Ts0 and the start of a DwPTS signal, the Ts0 can be added for the consideration. A single glitch is difficult to recognize, but two glitches are big enough. It is less possible that about 64 chips are exactly between the two glitches.

Figure 6:
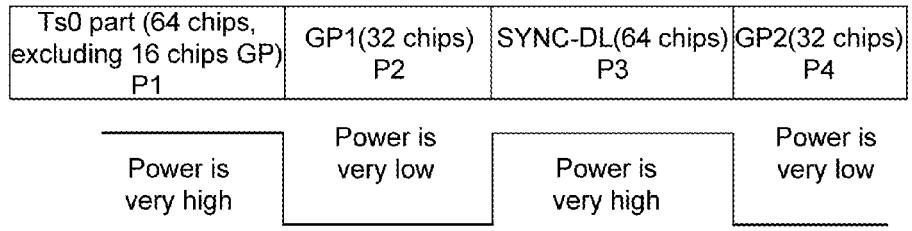
FIG. 6 is a diagram illustrating power calculation in consideration of a Ts0 according to an embodiment of the present disclosure.

Thus, the consideration for the Ts0 can be added into an original eigenvalue calculation formula. When a greater eigenvalue can be calculated by means of the original eigenvalue formula and there is an obvious Ts0 power ahead of 64 chips, it is regarded that the obtained eigenvalue formula is true, which can filter a majority of glitches. FIG. 6 shows a diagram illustrating consideration of power calculation for a Ts0 according to an embodiment of the present disclosure. A calculation formula of the eigenvalue can be expressed as follows:

$$R = \frac{(P1 + P4)/2}{P2 + P3}.$$

Based on the above analysis, the embodiment provides an implementation solution. The calculation of the eigenvalue of the DwPTS according to the first power value, the second power value, the third power value and the fourth power value is implemented by means of the following formula:

$$\text{eigenvalue} = \frac{(\text{first power value} + \text{fourth power value})/2}{\text{second power value} + \text{third power value}}.$$

By means of the implementation solution, the influence of the glitches on the calculation of the eigenvalue is eliminated favourably, thereby minimizing the calculation error of the eigenvalue.

In an actual running process, the spikes and the glitches will influence the calculation of the power values and the calculation of the eigenvalue. Thus, the embodiment provides an implementation solution. The acquisition of the first power value for the SYNC-DL segment includes: eliminating the spikes and the glitches within the DwPTS; and acquiring the first power value for the SYNC-DL segment within the DwPTS from which the spikes and the glitches are eliminated.

How to eliminate the spikes and the glitches is introduced below. The glitches are relatively narrow and only a half or much narrower of the DwPTS while the DwPTS has substantially consistent power. Thus, in a calculation formula for the DwPTS eigenvalue, 64 chips in the SYNC-DL segment can be divided into four groups, each having 16 chips. The four groups are set as four power points. Four power values are calculated respectively and then are sorted by size. The third largest power value is multiplied by 4 to obtain the first power value for the SYNC-DL segment, namely, power2_tmp = sort(power2_ext')

Power2 = power2_tmp(2,:).

Alternatively, 64 chips can also be divided into eight groups, each having 8 chips. The eight groups are set as eight power points, eight power values are calculated respectively and then are sorted by size, and the fourth largest power value is multiplied by 8 to obtain the first power value for the SYNC-DL segment.

Based on the above analysis, the embodiment provides an implementation solution. The step that the first power value for the SYNC-DL segment within the DwPTS from which the spikes and the glitches are eliminated is acquired includes that: a designated number of power points are set in the SYNC-DL segment, and each of the power points is calculated in sequence to obtain a designated number of power values; and the designated number of power values are sorted by size, and a mid-sized power value is multiplied by the designated number to obtain the first power value.

In an actual running process, a false DwPTS will influence the calculation of the power values and the calculation of the eigenvalue. Thus, the embodiment provides an implementation solution. The bottom noise is zero when Automatic Gain Control (AGC) is less. At this time, if small glitches exist, a wrong situation where a small value is divided by zero to obtain a large eigenvalue will be probably caused. For this, a value is added to the numerator and denominator in the eigenvalue formula respectively to avoid this situation, namely, $$\text{eigenvalue} = \frac{\min(\text{Power1}, \text{power3}) + c}{\max(\text{Power2}, \text{Power4}) \times 2 + c}.$$

Specifically, the calculation of the eigenvalue of the DwPTS according to the first power value, the second power value, the third power value and the fourth power value is implemented by means of the following formula:

$$\text{eigenvalue} = \frac{\min(\text{first power value, fourth power value}) + \text{set constant}}{\max(\text{second power value, third power value}) \times 2 + \text{set constant}}.$$

Figure 7:
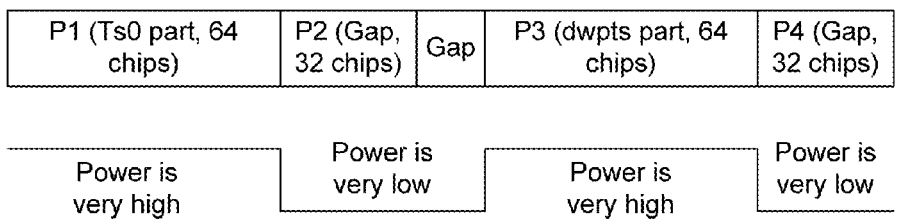
FIG. 7 is a diagram illustrating calculation of a continued eigenvalue of a DwPTS according to an embodiment of the present disclosure.

In order to solve the problems of broadening and inaccurate timing of the DwPTS and in view of that a DwPTS signal will be broadened after passing through a multi-path channel, a power difference among P1, P2 and P3 is reduced. In case of relative low SNR, the calculated eigenvalue may be over-small, may not reach a threshold or may be covered by a false eigenvalue. A solving method is that an interval of 16 chips is set between P1 and P2, so that no matter whether the DwPTS is broadened due to the channel, a reasonable eigenvalue will always be calculated. FIG. 7 is a diagram illustrating calculation of a continued eigenvalue of a DwPTS according to an embodiment of the present disclosure. A gap slot (GAP) is set between the SYNC-DL segment and the first GP segment. The GAP can be 16 chips or 8 chips or other values.

Figure 8:
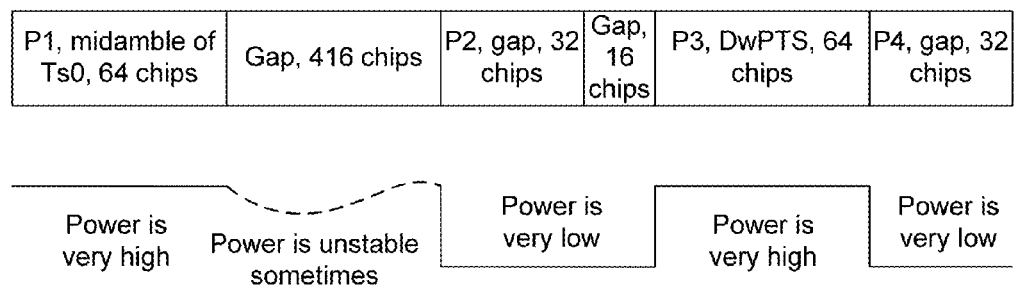
FIG. 8 is a diagram illustrating calculation of an eigenvalue of a midamble code in a Ts0 according to an embodiment of the present disclosure.

The unsmooth signal energy may occur in the Ts0. Furthermore, since the data of the Ts0 may exactly cancel each other out in the case of fewer code channels, an energy value for the Ts0 is zero and thus the calculated eigenvalue may be relatively small by using the above-mentioned formula. However, a basic midamble code is unchanged for a determined cell, and thus the power is relatively steady. Thus, a midamble part of the Ts0 can be used as P4. FIG. 8 is a diagram illustrating calculation of a midamble code in a Ts0 according to an embodiment of the present disclosure. The step that the fourth power value for the time slot 0 is acquired includes that: the fourth power value for a basic code part of the time slot 0 is acquired. By means of the above implementation solution, the fourth power value is more stable and more accurate, thereby further improving the accurate rate of eigenvalue calculation.

By means of the technical solutions in the embodiments of the present disclosure, the success rate of coarse synchronization for the CSR of the TD-SCDMA can be greatly improved. In the TD-SCDMA system, an eigenvalue search algorithm is a key step, which directly influences the performance of the CSR.

Usually, in a coarse synchronization method, a coarse synchronization position is determined by calculating the eigenvalue of the DwPTS namely a DwPTS signal and an energy ratio of a preceding GAP to a following GAP. In practice, due to the existence of various interference signals and timing offsets, a basic DwPTS eigenvalue calculation formula cannot meet real requirements, and thus the position of a wrong DwPTS signal is found, thereby reducing the success rate of frequency sweeping and the CSR. The robust DwPTS eigenvalue algorithm given by the embodiments of the present disclosure has a great resistance capability to various interference signals and timing offsets. In practice, by using a new DwPTS eigenvalue algorithm, the success rate of the CSR in the TD-SCDMA system can reach 99% or more.

An implementation method for CSR coarse synchronization is described below by way of the CSR in the TD-SCDMA system, which includes the following specific implementation steps.

1. 6400-point single-fold sampling data (input) of a subframe are input, and power calculation is performed to obtain 6400 power values. Pwr(k)=(real(input(k)))*(real(input(k)))+(imag(input(k)))*(imag(input(k))).

2. Every 16 power values are accumulated to obtain 400 power accumulated values. Pwr_sum(k)=Pwr((k−1)*16+1)+Pwr((k−1)*16+2)+ . . . +Pwr((k−1)*16+16).

3. P1, P2, P3 and P4 are calculated respectively by using the 400 power accumulated values, wherein P1 is a DwPTS power, P2 is a power of a GAP which precedes the DwPTS, P3 is a power of a GAP which follows the DwPTS, and P4 is a power of the Ts0. At a selected DwPTS position k, for P1, four DwPTS power accumulated values, namely Pwr_sum(k), Pwr_sum(k+1), Pwr_sum(k+2) and Pwr_sum(k+3), are sorted by size, and the third biggest power accumulated value is selected and multiplied by 4 to obtain a first power value for P1.

4. At the selected DwPTS position k, for P2, two DwPTS power accumulated values namely Pwr_sum(k−2) and Pwr_sum(k−3) are accumulated to obtain a second power value for P2.

5. At the selected DwPTS position k, for P3, two DwPTS power accumulated values namely Pwr_sum(k+4) and Pwr_sum(k+5) are accumulated to obtain a third power value for P3.

6. At the selected DwPTS position k, for P4, four Ts0 power accumulated values namely Pwr_sum(k−33), Pwr_sum(k−32), Pwr_sum(k−31) and Pwr_sum(k−30) are accumulated to obtain a third power value for P4.

7. If k is located at a boundary, a needed power accumulated value is located out of 400 points, the 400-point power accumulated values are cyclically used, namely a position k+delta is performed a modulus on, i.e., mod(k+delta, 400), and a corresponding value is selected from the 400-point power accumulated values.

8. A minimum value for P1 and P4 is selected as a numerator.

9. A maximum value for P2 and P3 is selected as a denominator.

10. A constant factor C is added to the numerator and the denominator respectively. The constant factor C is an empirical value and relates to a preceding interception process. An eigenvalue "engvalue" is calculated by means of the following formula:

engvalue=(min([P1,P4])+C)/(max([P2,P3])*2+C).

11. total 400 engvalues can be obtained, and the maximum value is selected as a DwPTS position.

In the embodiment, a simple eigenvalue algorithm is only applicable to an environment with high SNR and without interference. Once in an environment with glitch interference or an environment with low SNR, the success rate will be greatly reduced. By adopting the steady eigenvalue algorithm, the success rate for the CSR can be ensured to be over 99%, and the anti-interference capability of the CSR algorithm is greatly improved.

Figure 9:
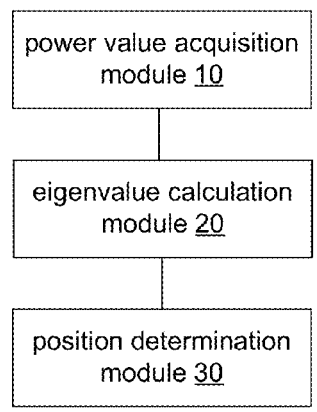
FIG. 9 is a structure block diagram illustrating a device for determining a position according to an embodiment of the present disclosure.

Corresponding to the method for determining the position introduced by the above embodiments, an embodiment provides a device for determining a position so as to implement the above-mentioned embodiments. FIG. 9 is a structure block diagram illustrating a device for determining a position according to an embodiment of the present disclosure. As shown in FIG. 9, the device includes a power value acquisition module 10, an eigenvalue calculation module 20 and a position determination module 30. The structure is introduced below in detail.

The power value acquisition module 10 is configured to acquire a first power value for a SYNC-DL segment within a DwPTS, a second power value for a first GP segment which precedes the SYNC-DL segment, a third power value for a second GP segment which follows the SYNC-DL segment, and a fourth power value for a time slot 0.

The eigenvalue calculation module 20 is connected to the power value acquisition module 10 and is configured to calculate an eigenvalue of the DwPTS according to the first power value, the second power value, the third power value and the fourth power value.

The position determination module 30 is connected to the eigenvalue calculation module 20 and is configured to determine the position of the DwPTS according to the eigenvalue.

By means of the above device, the power value acquisition module 10 acquires the four power values including the first power value for the SYNC-DL segment within the DwPTS, the second power value for the first GP segment which precedes the SYNC-DL segment, the third power value for the second GP segment which follows the SYNC-DL segment, and the fourth power value for the time slot 0, the eigenvalue calculation module 20 calculates the eigenvalue of the DwPTS according to the four power values; and the position determination module 30 determines the position of the DwPTS according to the eigenvalue. The problem of relatively low success rate of the DwPTS position determination solution in the related art is solved. In the embodiments of the present disclosure, by means of the improvement for the calculation formula for the eigenvalue of the DwPTS, a new calculation formula for the eigenvalue of the DwPTS has a great resistance capability to various interference signals and timing offsets, and the success rate for the CSR of the TD-SCDMA system is significantly improved.

In an embodiment, the eigenvalue calculation module 20 implements the calculation operation of the eigenvalue via the following formula:

$$\text{eigenvalue} = \frac{(\text{first power value} + \text{fourth power value})/2}{\text{second power value} + \text{third power value}}.$$

The power value acquisition module 10 includes a glitch elimination unit configured to eliminate spikes and glitches within the DwPTS and a first power value acquisition unit configured to acquire the first power value for the SYNC-DL segment within the DwPTS from which the spikes and the glitches are eliminated.

The first power value acquisition unit includes a power point calculation sub-unit configured to set a designated number of power points in the SYNC-DL segment and calculate each of power points in sequence to obtain a designated number of power values; and a first power value determination sub-unit configured to sort the designated number of power values by size, and multiply a mid-sized power value by the designated number to obtain the first power value.

The above eigenvalue calculation module 20 implements the calculation operation of the eigenvalue by means of the following formula:

$$\text{eigenvalue} = \frac{\min(\text{first power value}, \text{fourth power value}) + \text{set constant}}{\max(\text{second power value}, \text{third power value}) \times 2 + \text{set constant}}.$$

The above power value acquisition module 10 includes a fourth power value acquisition unit configured to acquire the fourth power value for a basic code part of the time slot 0.

In practice, the glitch elimination unit, the first power value determination sub-unit, the eigenvalue calculation module, the position determination module and the fourth power value acquisition unit can be implemented by a Central Processing Unit (CPU), a Digital Signal Processor (DSP) or a Field-Programmable Gate Array (FPGA) in the device for determining a position.

In the embodiments of the present disclosure, by means of the improvement for the calculation formula for the eigenvalue of the DwPTS, the new calculation formula for the eigenvalue of the DwPTS has a great resistance capability to various interference signals and timing offsets. By means of the improvement for the above-mentioned DwPTS eigenvalue algorithm, the resistance capability to the glitches and DwPTS extension can be greatly improved, so that the success rate of the CSR in the TD-SCDMA system can reach 99% or more.

Those skilled in the art should understand that the embodiments of the present disclosure can provide a method, a system or a computer program product. Thus, the present disclosure can be implemented by hardware, software or any combination thereof. Moreover, a computer program product implemented on one or more computer available storage media (including, but not limited to, a disk memory, an optical memory or the like) containing computer available program codes can be adopted in the present disclosure.

The present disclosure is described with reference to flowcharts and/or block diagrams of the method, the device (system) and the computer program product according to the embodiments of the present disclosure. It should be understood that each flow and/or block in the flowcharts and/or the block diagrams and a combination of the flows and/or the blocks in the flowcharts and/or the block diagrams can be implemented by computer program instructions. These computer program instructions can be provided for a general computer, a dedicated computer, an embedded processor or processors of other programmable data processing devices to generate a machine, so that a device for implementing functions assigned in one or more flows of the flowcharts and/or one or more blocks of the block diagrams is generated via instructions executed by the computers or the processors of the other programmable data processing devices.

These computer program instructions can also be stored in a computer readable memory capable of guiding the computers or the other programmable data processing devices to work in a specific mode, so that a manufactured product including an instruction device is generated via the instructions stored in the computer readable memory, and the instruction device implements the functions assigned in one or more flows of the flowcharts and/or one or more blocks of the block diagrams.

These computer program instructions can also be loaded to the computers or the other programmable data processing devices, so that processing realized by the computers is generated by executing a series of operation steps on the computers or the other programmable devices, and therefore the instructions executed on the computers or the other programmable devices provide steps for realizing the functions assigned in one or more flows of the flowcharts and/or one or more blocks of the block diagrams.

The preferred embodiments of the present disclosure have been described for purpose of example. Those skilled in the art will realize that various improvements, additions and replacements are possible. Thus, the scope of the present disclosure shall not be limited to the above-mentioned embodiments.

The invention claimed is:

1. A method for determining a position, comprising:
acquiring a first power value for a Synchronous Downlink (SYNC-DL) segment within a Downlink Pilot Time Slot (DwPTS), a second power value for a first Guard Period (GP) segment which precedes the SYNC-DL segment, a third power value for a second GP segment which follows the SYNC-DL segment, and a fourth power value for a time slot 0;
calculating an eigenvalue of the DwPTS according to the first power value, the second power value, the third power value and the fourth power value; and
determining the position of the DwPTS according to the eigenvalue;
wherein the calculation of the eigenvalue of the DwPTS according to the first power value, the second power value, the third power value and the fourth power value is implemented by means of a following formula:

$$\text{eigenvalue} = \frac{(\text{first power value} + \text{fourth power value})/2}{\text{second power value} + \text{third power value}}.$$

2. The method according to claim 1, wherein acquiring the first power value for the SYNC-DL segment comprises:
eliminating spikes and glitches within the DwPTS; and
acquiring the first power value for the SYNC-DL segment within the DwPTS from which the spikes and the glitches are eliminated.

3. The method according to claim 2, wherein acquiring the first power value for the SYNC-DL segment within the DwPTS from which the spikes and the glitches are eliminated comprises:
setting a designated number of power points in the SYNC-DL segment, and calculating each of the power points to obtain a designated number of power values; and
sorting the designated number of power values by size, and multiplying a mid-sized power value by the designated number to obtain the first power value.

4. The method according to claim 1, wherein the calculation of the eigenvalue of the DwPTS according to the first power value, the second power value, the third power value and the fourth power value is implemented by means of a following formula:

$$\text{eigenvalue} = \frac{\min(\text{first power value, fourth power value}) + \text{set constant}}{\max(\text{second power value, third power value}) \times 2 + \text{set constant}}.$$

5. The method according to claim 1, wherein acquiring the fourth power value for the time slot 0 comprises:
acquiring the fourth power value for a basic code part of the time slot 0.

6. The method according to claim 1, further comprising:
setting a gap slot between the SYNC-DL segment and the first GP segment.

7. A device for determining a position, wherein the device comprises a processor, the processor is configured to:
acquire a first power value for a Synchronous Downlink (SYNC-DL) segment within a Downlink Pilot Time Slot (DwPTS), a second power value for a first Guard Period (GP) segment which precedes the SYNC-DL segment, a third power value for a second GP segment which follows the SYNC-DL segment, and a fourth power value for a time slot 0;
calculate an eigenvalue of the DwPTS according to the first power value, the second power value, the third power value and the fourth power value; and
determine the position of the DwPTS according to the eigenvalue;
wherein the processor is further configured to calculate the eigenvalue of the DwPTS according to the first power value, the second power value, the third power value and the fourth power value is implemented by means of a following formula:

$$\text{eigenvalue} = \frac{(\text{first power value} + \text{fourth power value})/2}{\text{second power value} + \text{third power value}}.$$

8. The device according to claim 7, wherein the processor is further configured to:
eliminate spikes and glitches within the DwPTS; and
acquire the first power value for the SYNC-DL segment within the DwPTS from which the spikes and the glitches are eliminated.

9. The device according to claim 8, wherein the processor is further configured to:
set a designated number of power points in the SYNC-DL segment, and calculate each of the power points to obtain a designated number of power values; and
sort the designated number of power values by size, and multiply a mid-sized power value by the designated number to obtain the first power value.

10. The device according to claim 7, wherein the processor is further configured to implement the calculation operation of the eigenvalue by means of a following formula:

$$\text{eigenvalue} = \frac{\min(\text{first power value, fourth power value}) + \text{set constant}}{\max(\text{second power value, third power value}) \times 2 + \text{set constant}}.$$

11. The device according to claim 7, wherein the processor is
further configured to acquire the fourth power value for a basic code part of the time slot 0.

12. A non-transitory computer storage medium comprising a set of instructions which, when executed, cause at least one processor to execute a method for determining a position, wherein the method comprises:
acquiring a first power value for a Synchronous Downlink (SYNC-DL) segment within a Downlink Pilot Time Slot (DwPTS), a second power value for a first Guard Period (GP) segment which precedes the SYNC-DL segment, a third power value for a second GP segment which follows the SYNC-DL segment, and a fourth power value for a time slot 0;
calculating an eigenvalue of the DwPTS according to the first power value, the second power value, the third power value and the fourth power value; and
determining the position of the DwPTS according to the eigenvalue;
wherein the calculation of the eigenvalue of the DwPTS according to the first power value, the second power value, the third power value and the fourth power value is implemented by means of a following formula:

$$\text{eigenvalue} = \frac{(\text{first power value} + \text{fourth power value})/2}{\text{second power value} + \text{third power value}}.$$

\* \* \* \* \*